UNITED STATES PATENT OFFICE.

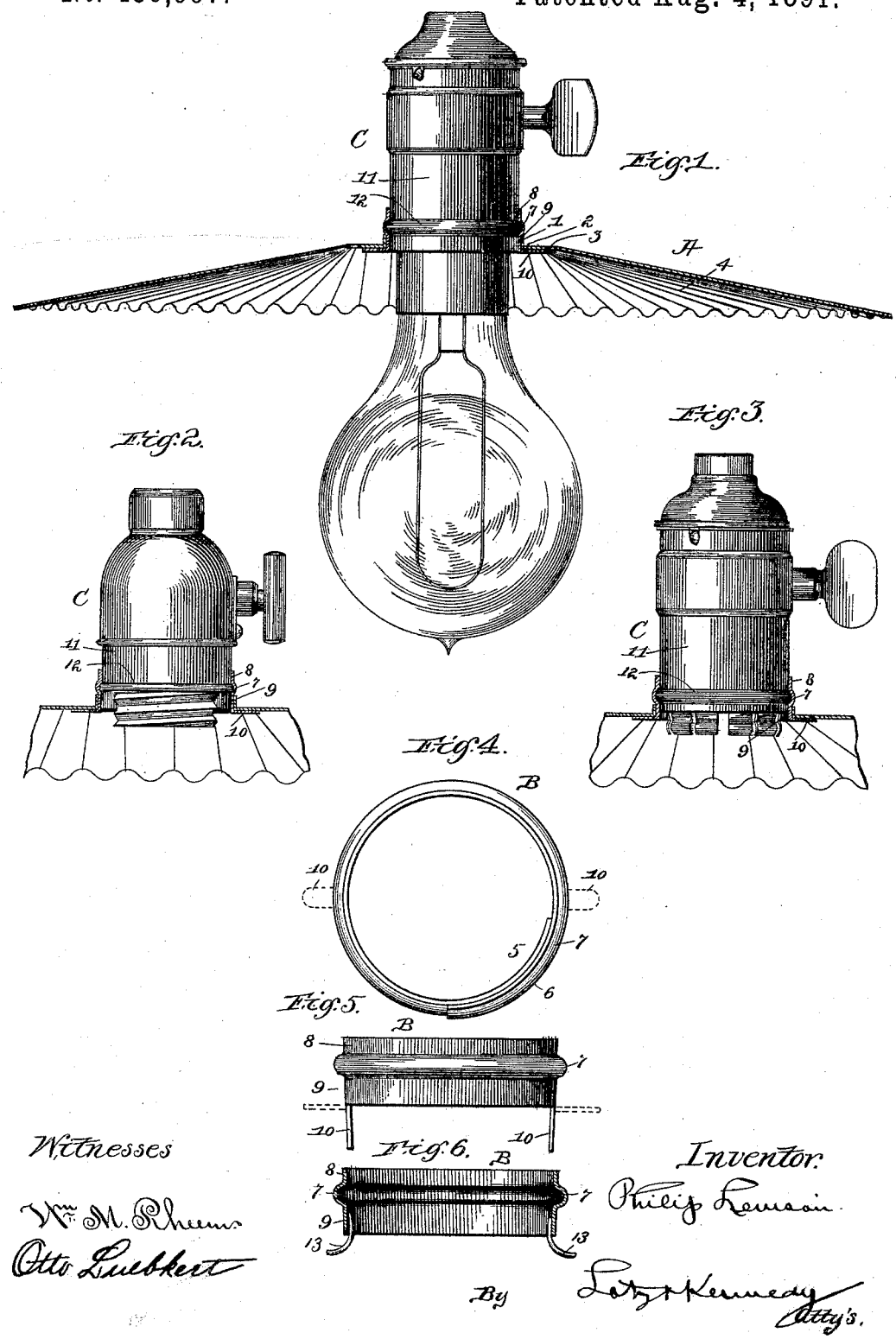

PHILIP LEVISON, OF CHICAGO, ILLINOIS.

COUPLING FOR ELECTRIC-LIGHT SHADES.

SPECIFICATION forming part of Letters Patent No. 456,997, dated August 4, 1891.

Application filed March 23, 1891. Serial No. 386,014. (No model.)

*To all whom it may concern:*

Be it known that I, PHILIP LEVISON, a citizen of the United States of America, residing at Chicago, in the county of Cook and State of Illinois, have invented certain new and useful Improvements in Couplings for Electric-Light Shades, of which the following is a specification, reference being had therein to the accompanying drawings.

This invention relates to a novel device or coupling-piece for securing shades to incandescent electric-light sockets, the objects being to provide a device of this character of simple, inexpensive, and durable construction; to provide a coupling that can be used in connection with any form of socket, and to provide a coupling that can be easily and quickly applied or removed.

The invention consists in the features of construction and combinations of parts hereinafter fully described, and specifically claimed.

In the accompanying drawings, illustrating my invention, Figure 1 is a central vertical section of a shade and coupling and an elevation of an incandescent electric-light socket, illustrating the application of my invention in coupling said shade to said socket. Figs. 2 and 3 are similar views showing different forms of sockets. Fig. 4 is a top plan view of the coupling. Fig. 5 is a side elevation, and Fig. 6 is a central vertical section, of a modified form of construction embodying my invention.

Referring to said drawings, it will be stated that three different forms of electric-light sockets have been shown for the purpose of illustrating the application of my invention, it being observed that the various forms of electric-light sockets now in use are provided, near their ends adjacent the bulb, with annular beads or ridges. These beads or ridges are of various sizes and are not located with regularity on the different sockets, since in some they are located at the edge of the socket while in others they are located more or less removed from said edge.

The form of shade A that has been selected to illustrate my invention is commonly made of thin sheet metal and has a central circular aperture provided with an upturned annular flange 1, rising from a flat portion 2. Said flat portion 2 is provided with the usual hot-air apertures 3 and a flaring shade or deflector 4. The diameters of the various sockets above referred to vary but slightly, and the diameter of the aperture in the shade is made a little longer than the diameter of said sockets, so as to permit the insertion of my novel construction of coupling, now to be described.

In Figs. 4 and 5 the coupling B is shown on an enlarged scale, and is preferably made of sheet metal or other analogous material. The said coupling B is made in the form of a ring, having overlapping end portions 5 and 6, and between its ends it is provided interiorly with an annular groove 7. Above said groove the plain portion 8 of the coupling is conveniently flared outwardly, while below said groove the plain portion 9 is slightly contracted or tapered and provided at its lower end with a plurality of flexible fingers 10.

In the different forms of sockets C, (shown in Figs. 1, 2, and 3,) 11 indicates the body of the socket, and 12 the annular bead or ridge near or at its end.

In uniting a shade to a socket with my coupling the said coupling is first placed around the end portion of the socket, with the bead or ridge 12 of said socket located within the groove 7 of said coupling. The coupling is then contracted so that it embraces the socket tightly. The socket and coupling are held in this position, and the central aperture in the shade is then placed over the fingers 10 on the end of said coupling, and flange 1 on the shade is placed around the lower plain portion 9 of the coupling, with the upper edge of said flange abutting against the ridge made by the groove 7. The flange 1 thus serves to hold the coupling around the socket, with the bead on the latter located within the groove of the coupling. The flanges 10 are then bent outwardly and upwardly, as shown in Figs. 4 and 5, and lie against the under face of the flat portion 2 of the shade, thereby completing the joint between the socket and shade. It is obvious that by bending the fingers 10 downwardly the shade and coupling can be removed and the coupling can be used again. By flanging outwardly the upper plain portion 8 of the coupling the insertion of the end of the socket therein is facilitated, and the tapering of the lower plain portion 9 facilitates the insertion of the coupling into the aperture of the shade.

It is preferable to make the couplings a little larger than the sockets, so that by compressing them they may be pressed against the said sockets, although it is obvious that said coupling can be smaller, in which case they are to be expanded before being placed on the sockets. The couplings can, moreover, be resilient or merely flexible, and the application of said coupling in either case will be obvious. It is further obvious that the aperture in the shade is not necessarily centrally located, as it can be otherwise located in other forms of shades, and that the coupling can be used with other forms of shades.

In Fig. 6 is shown a modified form of construction embodying my invention. In this construction the coupling is provided with outwardly-projecting curved fingers 13 instead of the flexible fingers 10. The said curved fingers 13 are bent inwardly and the shade is then passed over them, and their outwardly-projecting ends will retain the shade in position.

It will be understood that, except in the claims for the specific construction, any suitable devices can be employed for holding the shade to said coupling.

I claim as my invention—

1. A coupling of the kind specified, consisting of a continuous expansible and contractible ring having disconnected end portions and adapted to surround and engage an electric-light socket, and having devices for attaching the same to a shade having an aperture, the apertured portion of said shade serving to surround said ring and hold the same in engagement with said socket.

2. A coupling of the kind specified, consisting of an interiorly-grooved continuous expansible and contractible ring having disconnected end portions and adapted to surround and engage an electric-light socket, and having devices for attaching the same to a shade having an aperture, the apertured portion of said shade serving to surround said ring and hold the same in engagement with said socket.

3. A coupling of the kind specified, consisting of a continuous expansible and contractible ring having disconnected end portions and adapted to surround and engage an electric-light socket, and having flexible fingers at one end for attaching said coupling to an apertured shade, the apertured portion of said shade serving to surround said ring and hold the same in engagement with said socket.

4. A coupling of the kind specified, consisting of a continuous expansible and contractible ring having disconnected and overlapping end portions and adapted to surround and engage an electric-light socket, and having devices for attaching the same to an apertured shade, the apertured portion of said shade serving to surround said ring and hold the same in engagement with said socket.

In testimony whereof I affix my signature in presence of two witnesses.

PHILIP LEVISON.

Witnesses:
   HARRY COBB KENNEDY,
   OTTO LUEBKERT.